United States Patent [19]

Parkinson et al.

[11] Patent Number: 4,574,871
[45] Date of Patent: Mar. 11, 1986

[54] HEAT PUMP MONITOR APPARATUS FOR FAULT DETECTION IN A HEAT PUMP SYSTEM

[76] Inventors: David W. Parkinson, 106 Hollister Way, Burnt Hills, N.Y. 12027; Donald E. Bates, Box 323, Crooked St., R.D. 2, Broadalbin, N.Y. 12025; Raymond F. Poteralski, 363 E. R.D. #5, Schenectady, N.Y. 12306

[21] Appl. No.: 607,830

[22] Filed: May 7, 1984

[51] Int. Cl.[4] ............ F25B 13/00; G10M 19/00; G05D 23/00
[52] U.S. Cl. .......................... 165/1; 165/12; 165/29; 62/129; 62/231; 236/94; 364/184; 364/557
[58] Field of Search ............ 165/11 R, 29, 12, 1; 236/94; 62/126, 129, 231, 127; 364/505, 557, 569, 551, 183, 184, 185

[56] References Cited

U.S. PATENT DOCUMENTS

| | | | |
|---|---|---|---|
| 4,102,389 | 7/1978 | Wills | 165/29 |
| 4,217,761 | 8/1980 | Cornaire et al. | 62/130 |
| 4,232,530 | 11/1980 | Mueller | 62/126 |
| 4,234,927 | 11/1980 | First | 62/127 |
| 4,246,763 | 1/1981 | Mueller et al. | 62/126 |
| 4,262,736 | 4/1981 | Gilkeson et al. | 165/11 |
| 4,274,475 | 6/1981 | Rall et al. | 165/12 |
| 4,301,660 | 11/1981 | Mueller et al. | 62/126 |
| 4,381,549 | 4/1983 | Stamp, Jr. et al. | 165/11 R |
| 4,432,232 | 2/1984 | Brantley et al. | 62/127 |
| 4,510,576 | 4/1985 | MacArthur et al. | 364/557 |

FOREIGN PATENT DOCUMENTS

0019344 11/1980 European Pat. Off. ............ 165/12

Primary Examiner—William R. Cline
Assistant Examiner—John K. Ford
Attorney, Agent, or Firm—Heslin, Watts & Rothenberg

[57] ABSTRACT

A fault detection apparatus which monitors a heat pump system used for maintaining a selected temperature in an enclosed space is disclosed. The apparatus includes measuring the run time for a heat pump compressor, ascertaining the status of the heat pump reversing valve, measuring the run time of an auxiliary heating unit, measuring the run time of the defrost cycle of the heat pump, and sensing outdoor temperature. The compressor, the auxiliary heating unit, and the defrost cycle run times are each compared with their respective expected run times for the outdoor temperature sensed and for a known heat loss rate for the enclosed space. The apparatus will send out an alarm signal when the heat pump system fails to operate within the expected parameters.

10 Claims, 11 Drawing Figures

Fig_4B

Fig. 10

HEAT PUMP MONITOR APPARATUS FOR FAULT DETECTION IN A HEAT PUMP SYSTEM

BACKGROUND AND SUMMARY OF THE INVENTION

The invention is directed to an improved device for detecting faulty operation of a heat pump system. Specifically, this invention employs a comparison of the actual run time with the expected percent run time for the heat pump system being monitored.

The expected percent run time of a heat pump system with a known capacity is a function of the outside ambient air temperature and the heat loss of the enclosed space for which the temperature is to be maintained. As the outdoor ambient air temperature decreases, there will be an increase in the heat loss of the enclosed space. This combination will translate into an increase in the percent run time of the heat pump along with a decrease in its effective output. An auxiliary heat unit is normally provided to compensate for the difference between the heat loss of the enclosed space and the output of the heat pump at temperatures below a "balance point", that is, where the heat loss of the enclosed space is equivalent to the output of the heat pump.

A degradation in the efficiency of operation of the heat pump system will be reflected in an increase in the actual percent run time of the heat pump for a specified outdoor ambient air temperature, and a corresponding elevation in the balance point temperature. An increase in the actual percent run time of the heat pump results in its own higher energy consumption and an elevation of the balance point temperature results in greater use of the auxiliary heat which has a relatively higher rate of energy consumption. Unfortunately, until an abnormally high energy bill is received, the user is normally unable to detect when there is degradation in the efficiency of operation of a heat pump system since the temperature in the enclosed space will still be maintained.

Therefore, it is beneficial to equip a heat pump system with monitoring apparatus which will alert a user to a decrease in efficiency, thus allowing the user to minimize the use of the more expensive auxiliary heat by recognizing and correcting the problem as soon as it occurs. There is currently no effective available device for alerting the user to a decrease in efficiency of operation of a heat pump system over a wide ambient air temperature range. Previous devices have centered on monitoring a heat pump in relation to its balance point. However, those devices prove to be of limited value since the user will only be alerted to a decrease in efficiency should the auxiliary heat be activated above the expected balance point. Thus, with such devices, an inefficiently operating heat pump will not be detected while ambient air temperatures remain sufficiently above the balance point temperature so that the auxiliary heat is not activated.

An object of this invention is to provide monitoring apparatus for a heat pump system which will detect abnormal increases in the actual percent run time by monitoring the actual run time of the heat pump, the run time of the auxiliary heat, and the outdoor ambient air temperature over a fixed period of time.

A second object of this invention is to provide for a comparison of the expected percent run time for the average outdoor temperature measured and for the heat loss of the enclosed space with the actual percent run time and to provide an alarm signal when the heat pump system fails to operate within the expected parameters.

The apparatus of this invention is comprised of means for sensing the actual run time of the compressor of a heat pump system during a predetermined test time interval, means for sensing the average outdoor temperature during the test time interval, means for storing the expected run time for the compressor, means for comparing the actual run time with the stored expected run time and means for automatically providing an indication when the actual run time exceeds the expected run time.

The method of this invention involves the steps of sensing the actual run time of the compressor of a heat pump system during a predetermined test time interval, sensing the average outdoor temperature during the test time interval, storing the expected run time for the compressor, comparing the actual run time with the stored expected run time and automatically providing an indication when the actual run time exceeds the expected run time.

DETAILED DESCRIPTION OF THE DRAWINGS

Figure 1:
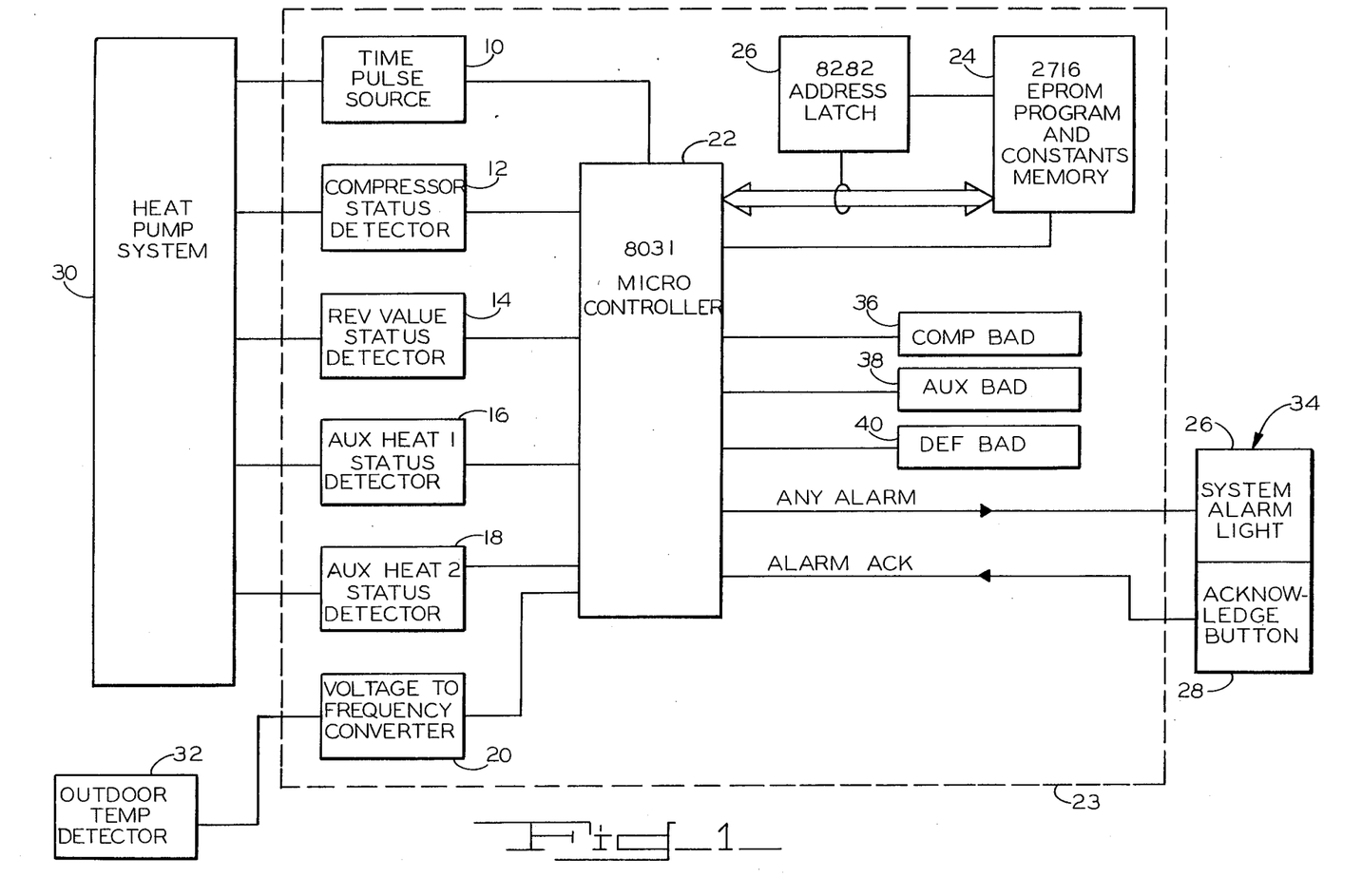
FIG. 1 is a block diagram showing the organization of the components of the invention.

FIG. 1 shows the general organization of the apparatus of this invention.

Heat pump system 30 is assumed to be of the conventional type having, among other things, a compressor, a thermostat inside the building being heated or cooled, a reversing valve for switching the system between a heating mode and an air conditioning mode by controlling the direction of refrigerant flow, primary and secondary auxiliary heating units and 24 Volt AC control circuits. The circuit components of the heat pump monitor are for the most part mounted on a circuit board 23 which may be installed indoors at a convenient location. A remote alarm panel 34, however, is desirably mounted at an indoor location where it will be easily seen as, for example, near the thermostat used to control heat pump system 30. The purpose of remote alarm panel 34 is simply to provide a general indication of a fault in heat pump system 30 in order to alert the user to contact service personnel. Three specific fault indicator LED's 36, 38 and 40 are mounted on circuit board 23 in order to provide specific alarms for excessive run times in the compressor, auxiliary heat and/or the defrost cycle, respectively. These specific fault indicators are primarily for assisting service personnel in locating a malfunction in heat pump system 30. As a matter of general organization, it may also be observed that a remote outdoor temperature detector 32 is electrically connected to the appropriate components on circuit board 23.

A special microcontroller 22 is provided to receive a series of inputs which are indicative of the status of the heat pump system 30. These input signals are processed by microcontroller 22 and used to compute the actual percent run times of various components in heat pump system 30 during a given time period. These actual percent run times are compared with expected percent run times which have been previously stored in a program and constants memory 24 which may be an Erasable Programmable Read Only Memory (EPROM). Memory 24 is coupled to microcontroller 22 by an address latch device 26.

One of the inputs to microcontroller 22 is generated by a time pulse source 10 connected between the heat pump system 30 and microcontroller 22. The purpose of time pulse source 10 is to provide microcontroller 22 with a timed pulse signal which it uses for counting elapsed time and controlling the sequence of its own operation. Time pulse source 10 is conveniently connected to the 24 V AC control power of the heat pump system 30 and may be comprised of conventional components for converting an AC signal into an appropriate TTL level logic signal to be fed into microcontroller 22. For example, a Zener diode may be used with a series resistance to provide a rectified signal limited to 5 V. That signal may be passed through an optoisolator device for generating the TTL signal. That signal may then be passed through a Schottky inverter to give it a clean and square configuration for inputting to the microcontroller 22. A commercially available optoisolator device which has functioned satisfactorily is identified by Model No. 4N32 and manufactured by General Instruments Corporation of Palo Alto, Calif. Any other arrangement for providing an appropriate timing signal may, of course, be used.

A compressor status detector 12 is used to provide another input to microcontroller 22 to indicate whether the compressor is activated or deactivated. Compressor status detector 12 is connected to the indoor thermostat circuit and when AC voltage is detected therein, indicating that heating or cooling is being called for and, presumably, that the compressor is running, it provides a digital input signal to microcontroller 22 in the form of a TTL 1. Any suitable component may be used for this purpose. For example, an AC line detector identified by Model No. MID400 manufactured by the General Instruments Corporation of Palo Alto, Calif. may be connected through an appropriate resistor to the thermostat circuit with its output connected to microcontroller 22.

Similarly, MID400 AC line detectors are used in the reversing valve status detector 14, the primary auxiliary heat status detector 16 and the secondary auxiliary heat status detector 18. Reversing valve status detector 14 is connected to the 24 V AC control circuit for the solenoid that drives the valve. The output of reversing valve status detector 14 is a TTL 1 when it is in the air conditioning or defrost modes. Depending upon whether the AC solenoid circuit is energized or de-energized in that mode, it may be necessary to use an inverter between the AC status detector and microcontroller 22. Each of the auxiliary heat status detectors 16 and 18 has its input connected to its respective 24 V control circuit which controls its related heating unit. When an auxiliary heating unit is on, a TTL level logic 1 is provided as an input to microcontroller 22.

Information concerning the outdoor temperature is provided to microcontroller 22 by means of an outdoor temperature detector 32 and a voltage-to-frequency converter 20. Outdoor temperature detector 32 is a conventional analog device such as a Model No. AD590 manufactured by Analog Devices Inc. of Norwood, Mass. which provides an output current whose magnitude is directly proportional to temperature in absolute degrees. This current is fed to the voltage-to-frequency converter 20. Device 20 first converts the current to a voltage which may be trimmed and filtered in a conventional way to eliminate unwanted noise. The voltage signal is then applied to an analog voltage-to-frequency converter such as, for example, an AD 537 manufactured by Analog Devices Inc. of Norwood, Mass. The output of this device is a frequency that is directly proportional to its voltage input and hence, to the output current of outdoor temperature detector 32 and to the outdoor temperature itself. The output of voltage-to-frequency converter 20 is then passed through a Schottky gate to square up the wave form and it is then applied to the microcontroller 22 as an input to one of its counters.

Microcontroller 22 is an INTEL 8031 which is programmed in a manner to be described with reference to FIGS. 2-10. The 8031 can be used with an external ROM such as that indicated in FIG. 1 as the program and constants EPROM 24. The program and constants EPROM 24 may be an INTEL 2716 which can be interfaced with microcontroller 22 by means of an address latch 26. Address latch 26 may be an INTEL 8282 device. Those skilled in the art are familiar with the manner in which the inputs and outputs of microcontroller 22 may be configured. Likewise, those skilled in the art are familiar with the wiring required to make proper interconnections between microcontroller 22, program and constants memory 24 and address latch 26. Reference may be made to the following manuals and literature available from the Intel Corporation of Santa Clara, Calif. for a complete explanation and instructions concerning these matters: 1982 Intel Microcontroller User's Manual No. 210359-001 and 1982 Intel Applications Handbook No. 210316-001.

The program and constants memory 24 is used to store a table of values for converting frequency measurements derived from voltage-to-frequency converter 20 into temperature values in degrees Centigrade. Memory 24 is also used to store expected percent run times for the heat pump compressor, the auxiliary heaters and the expected defrost cycle time at each Centigrade level of outdoor temperature on a degree by degree basis over a preselected temperature range of say −28° C. to 16° C. or any desired range. This data can be calculated by using the known heat loss or heat gain rate of the building to be heated or cooled and the known outputs of the heat pump and the auxiliary heaters. Once the necessary expected run times are stored in the program and constants memory 24, they are available for use as microcontroller 22 cycles through the program sequence to be described below.

As an alternative to the above-described arrangement, modifications could be made which would make it unnecessary to store the run times for each centigrade degree in the selected range. Instead, it would be possible to provide a series of input switches which would enable one to enter a code which would indicate the capacity of the heat pump and the auxiliary heaters as well as the heat loss or heat gain rate of the building.

With such an arrangement, this data could be read by microcontroller 22 at the beginning of each cycle and used later in the cycle to compute and temporarily store expected run times only for the temperatures actually sensed. This modification has not been implemented at the present time, although it is believed to be entirely feasible.

As mentioned above, an indicator panel 34 is provided for the user, preferably near the thermostat in the building being heated or cooled. Panel 34 is equipped with a single alarm light 26 which will be energized if an excessive run time is detected for the heat pump or the auxiliary heaters or if an excessive defrost execution time is detected. A push button 28 is provided on panel 34 to acknowledge and extinguish the alarm indication. Alarm indicator 34 is controlled by an output from microcontroller 22 which drives a solid state switch which, in my preferred embodiment, is an optically isolated triac. The triac is connected across any suitable AC power source so that once it is turned on by microcontroller 22, it becomes conducting and provides continuous AC power on its output which, in turn, is connected to the indicator panel for the illumination of light 26. The triac may be an MCP3011 manufactured by General Instruments Corporation. In order to provide a reset function, a push button is provided which connects the output of the triac to an AC detector which may be an MID400 as described above. The output of the AC detector may then be used to produce a TTL level voltage as an input to microcontroller 22 as an interrupt signal. As indicated below, the programming of microcontroller 22 will respond to the interrupt signal by turning off all alarm indicators, resetting all of the internal program alarm flags and by turning off the triac, thus removing power to the push button. This arrangement prevents the inadvertent resetting of the internal alarm flags by an unintentional depression of the acknowledge push button 28 because the push button is powered only during an actual alarm indication.

Power for the operation of microcontroller 22 and its associated components may be provided by a suitable conventional power supply.

Referring now to FIGS. 2–10, microcontroller flow diagrams are shown for monitoring heat pump system 30 when it is in the heating mode. In this mode, it is assumed that the indoor thermostat controlling the heat pump system 30 has been set at a normal heating level of about 68° F. or 20° C. Microcontroller 22 may be suitably programmed to execute the illustrated steps using well known programming techniques. In these flow diagrams bullets indicate main routine and subroutine entry points, rectangular boxes represent program instructions, diamond shaped boxes indicate program inquiries, arrows show the direction of flow, circles represent junctions and circles with "RET" in the center denote an instruction to return to a point of call.

In general, this invention functions by monitoring the operation of heat pump system 30 during discrete four-hour test periods, although test periods of other lengths could be used if desired. An initial outdoor temperature reading is taken at the beginning of the four-hour test period and at the end of each elapsed hour during that period. Also, during the test period the actual run times for the compressor, auxiliary heat units and the defrost cycles are accumulated. The primary and secondary auxiliary heat units are monitored individually through detectors 16 and 18, respectively, but their total run times are added together and treated as a single data item, that is, auxiliary heat run time. At the end of each four-hour test period, the percent run times for the compressor and the auxiliary heat units are computed and an average outdoor ambient temperature is computed. Note that, since the two auxiliary heat units yield a single data item, it is possible to have a percent run time for auxiliary heat which exceeds 100%. Also, at the end of a four-hour test period, the total run time for the defrost cycles executed is summed. The measured percent run times for the compressor and auxiliary heat units are compared to the expected percent run times for the average temperature measured during the four-hour test period. Also, the actual time accumulated for the execution of defrost cycles is compared with an expected defrost time. The expected percent run times and the expected defrost time are stored in memory 24 for this purpose, as mentioned earlier. Should the percent run time for the compressor exceed the expected run time, fault indicator LED 36, "COMP BAD" (shown in FIG. 1), is energized. Similarly, if the measured percent run time for the auxiliary heat units exceeds the expected percent run time, the fault indicator LED 38, "AUX BAD", is energized. Finally, if the defrost cycle run time exceeds a predetermined amount, then the fault indicator LED 40, "DEF BAD", is energized. Upon energizing any one of the three fault indicators 36, 38 or 40, microprocessor 22 also energizes the system alarm light 26 on user panel 34.

During the operation of the invention, microcontroller 22 keeps track of elapsed time by counting each cycle of the 24 V AC control power. This operation is based upon the input to microcontroller 22 from time pulse source 10.

Figure 2:
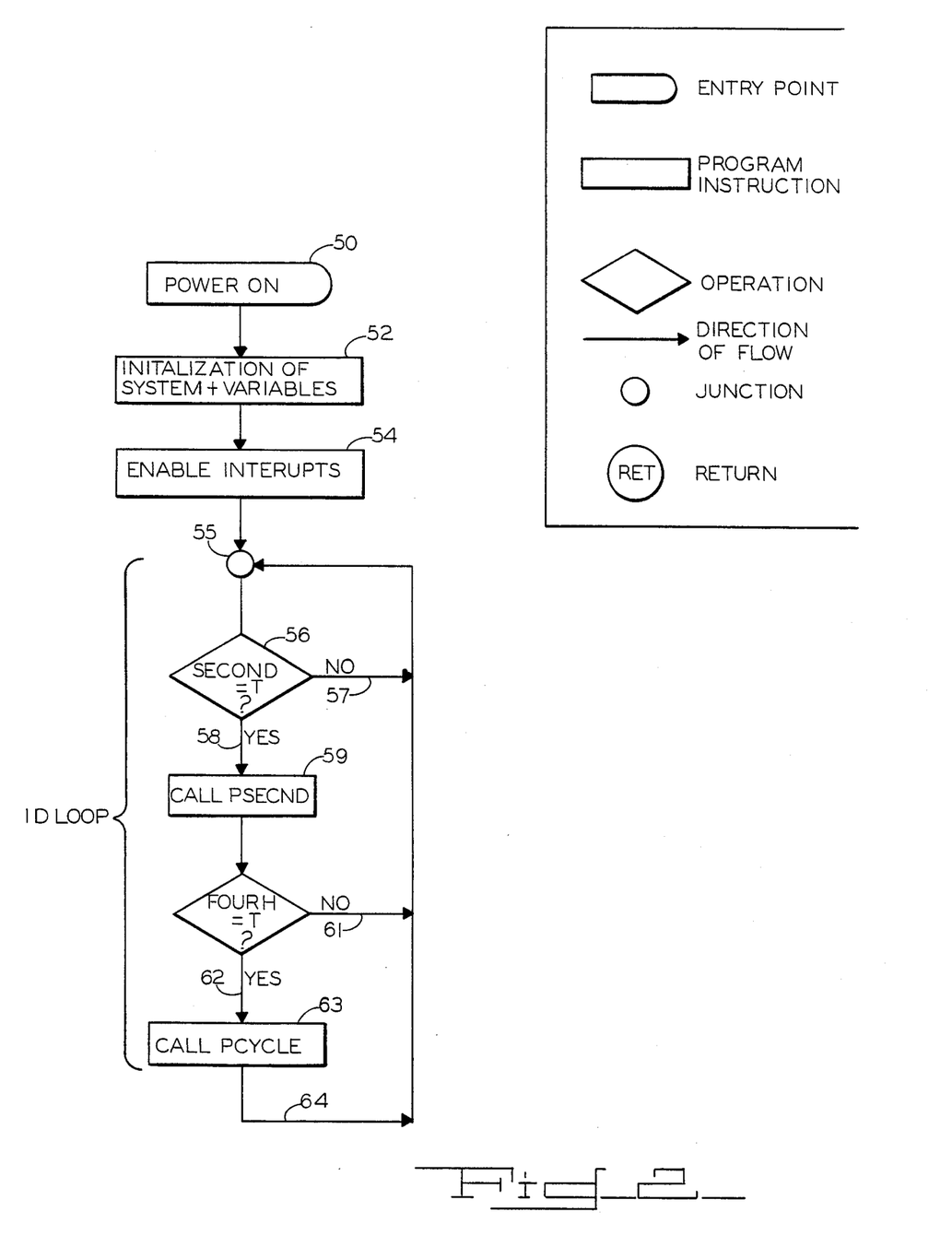
FIG. 2 is a flow chart illustrating the main program executed by the microcontroller of this invention.

FIG. 2 illustrates the main program flow diagram. In addition to the main program, there are several routines, the most frequently executed ones being an interrupt routine INTR1 that is executed every one-sixtieth of a second, a PSECND routine that is executed once each second and a PCYCLE routine that is executed at the end of the four-hour test period. The interrupt routine INTR1 causes the microprocessor to read the value of the outdoor temperature counter on every sixth interruption or 100 msec. Upon the accumulation of 60 interruptions, a one second flag is set and the microprocessor is caused to read the status of the heat pump system. If the compressor is on, the flag "COMPON" is set; if the reversing valve solenoid is energized, the flag "REVON" is set; if the primary auxiliary heat unit is on, the flag "AUX1ON" is set and if the secondary auxiliary heat unit is on, the flag "AUX2ON" is set. Then the PSECND routine will be called.

Figure 4A:
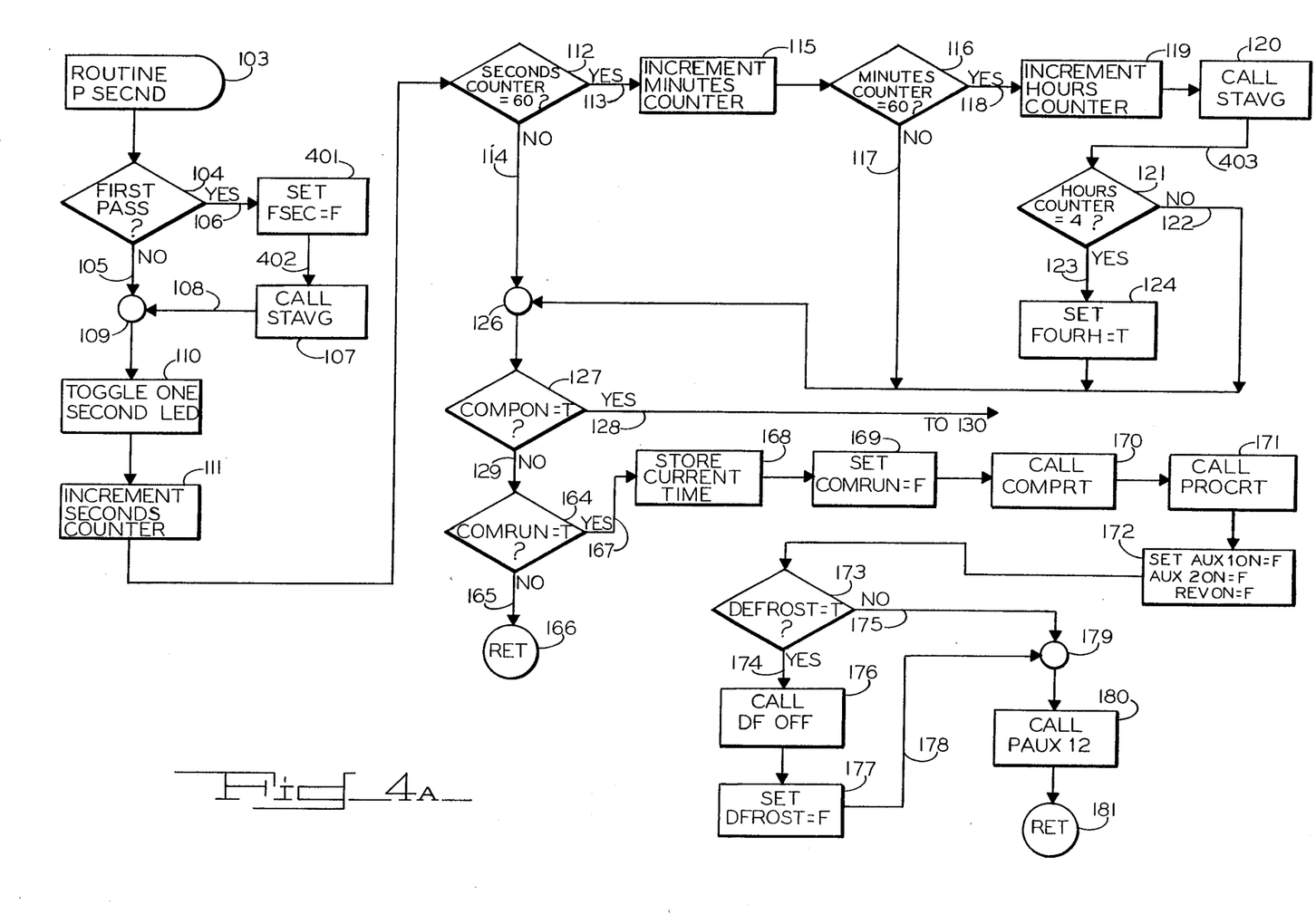
FIGS. 4A and 4B are flow charts of routine PSECND.
Figure 4B:
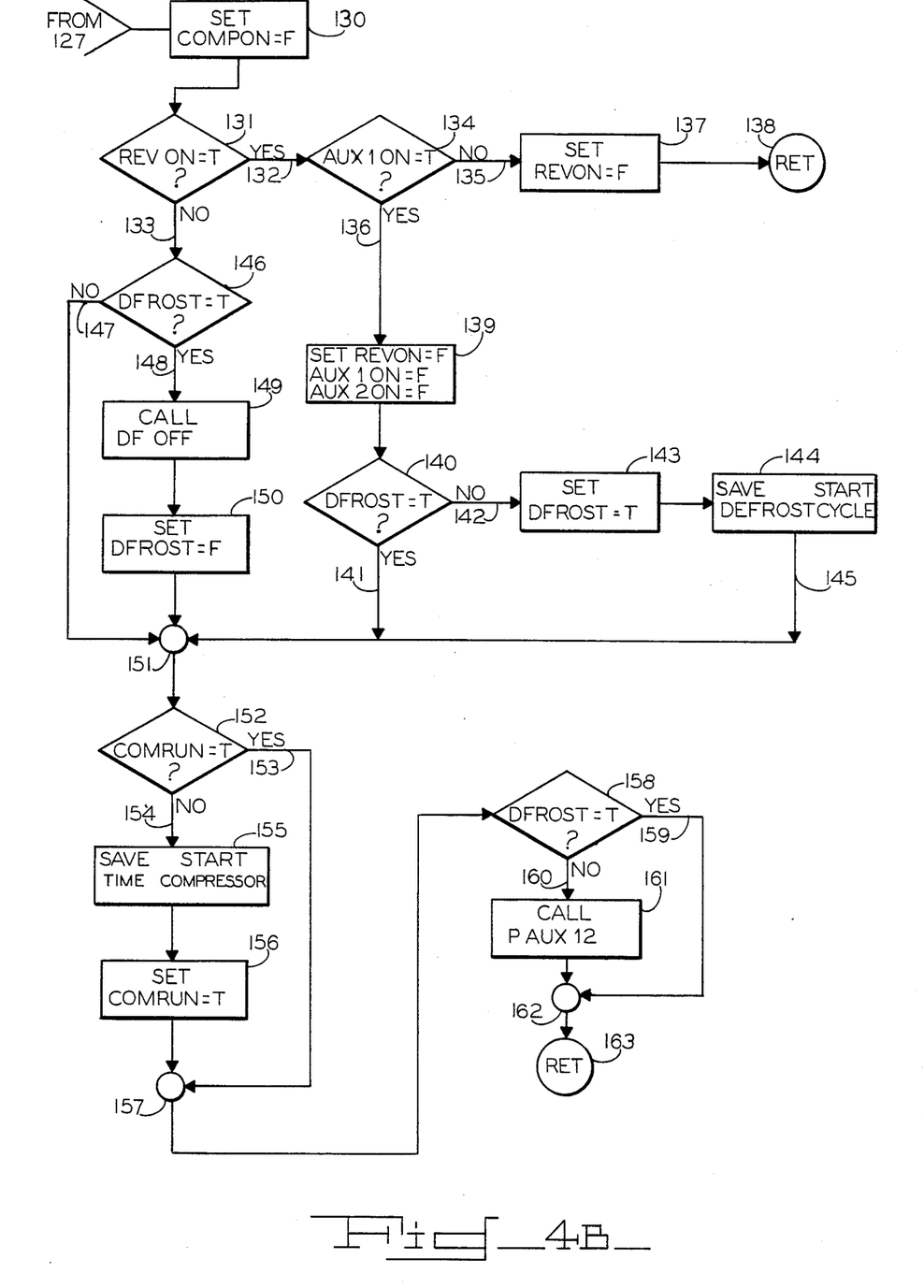

The PSECND routine stores the outdoor temperature on its first execution and after each hour of time passes. Also, PSECND stores the current time readings upon detecting that the compressor has just been activated or deactivated in the heating mode or that an auxiliary heater has just been energized or deenergized or that a defrost cycle has just begun or ended. PSECND causes such data to be processed at appropriate times. Finally, PSECND sets the four-hour flag after four hours have elapsed. Then the PCYLCE routine will be called.

Figure 5:
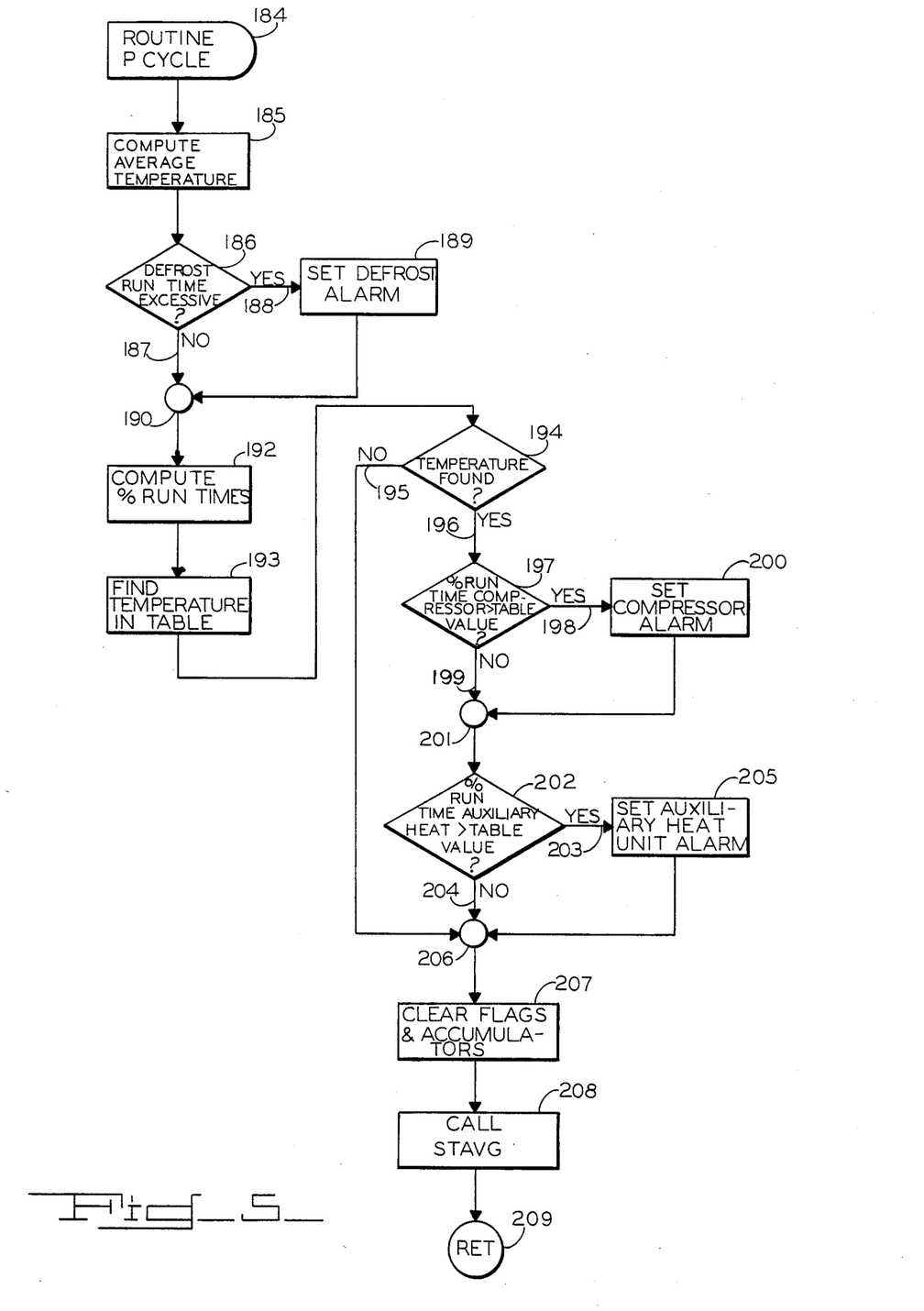
FIG. 5 is a flow chart of the routine PCYCLE.

The PCYCLE routine causes the microcontroller to compute percent run times for the compressor and the auxiliary heat units for the four hour test time interval and to compare them with expected run times. This routine also compares actual defrost cycle time with the expected defrost cycle time. Finally, the PCYCLE routine initiates the appropriate alarms when the expected times are exceeded.

As an aid to understanding the detailed description of FIGS. 2-10 which follows, it should be mentioned at this point that a number of flags have been used in programming microcontroller 22 and that, when inquiry as to their status is made during execution of the program, those listed below have the following logical meanings when they are "True":

FSEC—this is the first pass through the PSECND routine
SECOND—one second of time has elapsed
FOURH—four hours of time have elapsed
COMPON—the compressor is running now
COMRUN—the compressor was running when this routine of the program was last executed
AUX1ON—auxiliary heat unit No. 1 is energized now
AUX1RN—auxiliary heat unit No. 1 was energized when this routine of the program was last executed
AUX2ON—auxiliary heat unit No. 2 is energized now
AUX2RN—auxiliary heat unit No. 2 was energized when this routine of the program was last executed
REVON—the reversing valve solenoid is energized
DFROST—the heat pump system was executing a defrost cycle when this routine of the program was last executed As shown in FIG. 2, the main program flow begins at entry point 50 "Power On or Reset" reflecting the commencing status of the heat pump monitor apparatus, that is, when power is initially supplied to activate the monitor. The system initially flows to a series of program instructions, 52 "Initialization of System and Variables" and 54 "Enable Interrupts". Instruction 52 performs the initialization of the microcontroller and all necessary variables. Flag FSEC is set to "True"; all other flags are set to "False". Instruction 54 activates the interrupt subroutine INTR1 which will be discussed in detail below with reference to FIG. 3. As noted above, the SECOND flag is used to indicate an elapsed second and the FOURH flag is used to indicate an elapsed test period of four hours. The system then flows via junction 55 into the main program's principal loop, IDLOOP. During each pass in IDLOOP the microprocessor is caused to check the flags labeled SECOND AND FOURH. If they are found to be set to "True", the main program calls the PSECND and PCYCLE routine, respectively.

Figure 3:
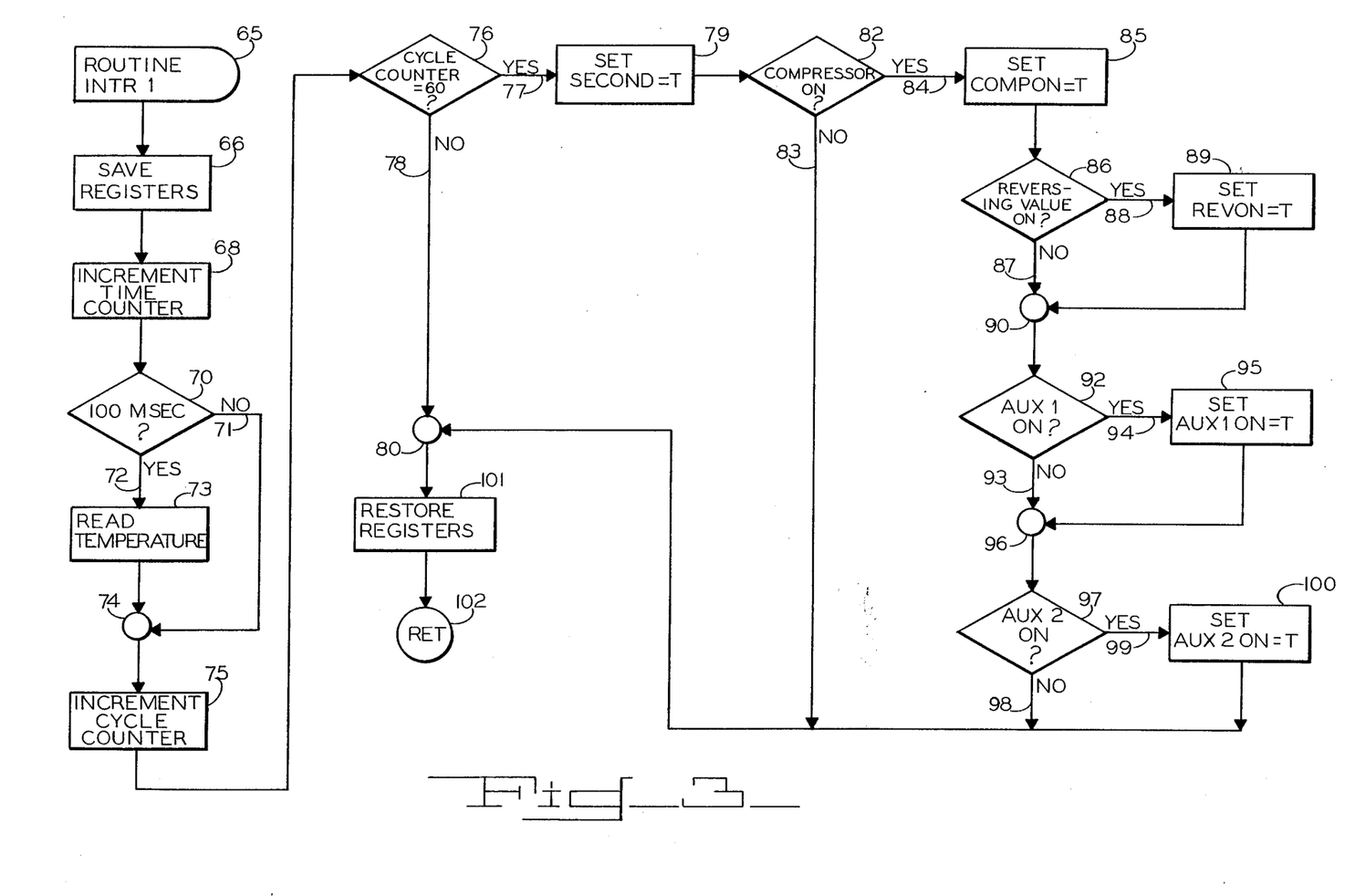
FIG. 3 is a flow chart showing the details of an interrupt routine INTR1.

IDLOOP is interrupted every 1/60th of a second by the interrupt routine INTR1 which is illustrated in FIG. 3. The interrupt routine is driven by a 60 hertz clock derived from the time pulse source 10 described above and has an entry point at 65 "Routine INTR1". The routine initially saves the data in the registers at the time of interrupt, 66 "Save Registers", and increments a time counter, 68 "Increment Time Counter". The execution of "Save Registers" is accomplished in a conventional way by transferring any data being stored in the main memory of microcontroller 22 to a data stack from where it will be retrieved after completion of routine INTR1. The reason for using a "Save Registers" instruction at this point is that the interrupt routine INTR1 will typically be activated while another routine or subroutine in the main program IDLOOP is in progress. Upon completion of the INTR1 routine, the saved data will be restored to the main memory and the program flow will return to the point of interruption for continuation of the routine or subroutine that was in progress.

The flow from instruction 68 is to inquiry 70 "100 msec?". If the time counter shows that 100 milliseconds or 6 interruptions have occurred, the answer is "yes" and a signal is sent via path 72 to instruction 73 "Read Temperature", which directs that the value of the outdoor temperature counter is to be read. This simply causes the current reading of the frequency counter driven by the voltage-to-frequency converter 20 (see FIG. 1) to be stored for later use during an execution of the PSECND routine. From instruction 73, flow would pass to junction 74. If 100 milliseconds had not elapsed, a "no" response at 71 would have caused flow directly to junction 74 without taking a frequency counter reading at 73.

From junction 74 the processor is instructed to increment the cycle counter, 75 "Increment Cycle Counter", and then to question whether the cycle counter has counted 60 cycles or one second, 76 "Cycle Counter=60?". If "no" flow proceeds via 78 to junction 80 and thence to instruction 101, "Restore Registers", at which point the data transferred to a data stack at instruction 66 is popped therefrom and returned to the main memory of microcontroller 22. After that, the processor returns to point of interrupt, 102 "RET". Should one second elapsed time have been measured, a "yes" response at 77 activates the setting of the SECOND flag, 79 "Set SECOND=T".

After setting the SECOND flag, routine INTR1 directs the processor to determine the status of the heat pump. Inquiry 82 "Compressor On?" determines whether the compressor is running and, if "no", flow proceeds to junction 80 via 83. If the compressor is running, a "yes" response at 84 causes flow to instruction 85 which directs that the COMPON flag be set, "Set COMPON=T". Inquiry is then made at 86, "Reversing Valve On?" to determine if the reversing valve solenoid is energized, a positive response indicating that the heat pump is in a defrost cycle. If "no", flow proceeds to junction 90 via 87 and, if "yes", the REVON flag is set as flow proceeds via 88 to instruction 89 "Set REVON=T", and thence to junction 90. From junction 90 inquiry is made to determine whether the primary auxiliary heating unit is running, 92 "AUX1 On?", and if "no" the flow proceeds to junction 96 via 93. Should the primary auxiliary heating unit have been on, a response at 94 would have caused the AUX1ON flag to be set, 95 "Set AUX1ON=T". From instruction 95 flow passes to junction 96 and from thence to inquiry 97 "AUX2 ON?" to determine if the secondary auxiliary heat unit is running, and if "no", a response at 98 causes flow to junction 80. Should the secondary auxiliary heating unit have been on, then the flow would have proceeded via 99 to instruction 100 "Set AUX2ON=T", and thence to junction 80. Having completed the status check of the compressor, the reversing valve, and the primary and secondary auxiliary heating units, the processor is instructed to restore the data to the registers present at time of interrupt, 101 "Restore Registers", and then to return to point of interrupt 102 "RET".

Referring back to FIG. 2, from junction 55 flow proceeds to inquiry 56 "SECOND=T?", to determine if the SECOND flag has been set, which would indicate the elapsed time of a second, and if "no" flow passes back to junction 55 via 57. Should an elapsed second have been recorded, a "yes" response at 58 causes flow to instruction 59 "Call PSECND", which directs the processor to execute the PSECND subroutine.

As noted above, the PSECND routine controls the acquisition and processing of data relating to the status of heat pump system 30. It does this by first checking the flags for the compressor, reversing valve and auxiliary heat set by the interrupt routine INTR1 and then processing the resulting data. This routine is illustrated in FIGS. 4A and 4B. From the entrance point, 103 "Routine PSCND", an initial inquiry is made to determine if this is the first pass through the routine after the monitor has been initially activated, 104 "FSEC=T?". The variable FSEC having been set equal to "True" during initialization. If "no" then flow proceeds via 105 to junction 109 and if "yes" a response at 106 causes flow to instruction 401 "Set FSEC=F". Then the flow is via 402 to instruction 107, "Call STAVG", which directs that an initial outdoor temperature reading be obtained and added to an accumulator by calling a subroutine STAVG, after which flow advances to junction 109 by way of 108. Subroutine STAVG will be described with reference to FIG. 6.

From junction 109 the processor is instructed to toggle an LED labeled One Second, 110 "Toggle One Second LED" and to increment the seconds counter 111, "Increment Seconds Counter". Toggling the LED once a second simply provides a visual indication that the monitor is operating. From instruction 111 flow is to inquiry 112 "Seconds Counter=60?", which seeks to determine if 60 seconds have been counted, and if "no" flow proceeds via 114 to junction 126. Should 60 seconds have been counted, a "yes" response at 113 causes flow to instruction 115 "Increment Minutes Counter", and thence to inquiry 116 "Minutes Counter=60?", which seeks to determine whether 60 minutes have elapsed, and if "no" flow proceeds via 117 to junction 126. Should 60 minutes have been counted, a "yes" response at 118 causes flow to instruction 119 "Increment Hours Counter", in which the processor is directed to increment the hours counter. Of course, the seconds counter and the minutes counter would each be returned to zero by the next program instruction in each case if a count of 60 is shown. Instruction 120 "Call STAVG" then directs the processor to call subroutine STAVG, which again directs the processor to obtain an outdoor temperature reading and add it to the accumulator for averaging at the end of the four-hour cycle. It may be observed here that temperature readings are taken and accumulated at the beginning of the four hour test time interval and again at the end of each of the four hours. From instruction 120 flow is via 403 to inquiry 121, "Hours Counter=4?" which determines if four hours have elapsed, and if "no" then flow passes via 122 to junction 126. Should four hours have elapsed, a "yes" response at 123 causes flow to instruction 124 "Set FOURH=T" which forces an end to the monitoring cycle by setting the FOURH flag. After setting the FOURH flag flow is to junction 126.

From junction 126, inquiry is made to determine if the compressor is running by examining the state of the COMPON flag, 127 "COMPON=T?". Should the COMPON flag be set, a "yes" response at 128 causes flow to construction 130 (See FIG. 4B) "Set COMPON=F" which directs the processor to clear the COMPON flag. From instruction 130, (FIG. 4B) flow is to inquiry 131 "REVON=T?" which determines if the REVON flag is set, and if a "yes" flow is to inquiry 134 via 132. Inquiry 134 seeks to determine whether the primary auxiliary heating unit is energized, "AUX1ON=T?" If a "no" response appears at 135 it indicates that the heat pump system 30 is in an air conditioning mode in which case the processor is instructed to clear the REVON flag, 137 "REVON=F", and to return to point of call, 138. Should the primary auxiliary heating unit have been running, as indicated by the AUX1ON flag being set to "True", it means the heat pump system 30 is in a defrost cycle. A "yes " response at 136 causes flow to instruction 139 in which the REVON, AUX1ON, AUX2ON flags are all cleared, "REVON=F, AUX1ON=F, AUX2ON=F". From instruction 139, inquiry 140 "DFROST=T?" determines if flag DFROST is set, which would indicate that the heat pump had been in the defrost cycle on the previous pass through the PSCND routine. If "yes", then flow proceeds via 141 to junction 151. A "no" response thus means a new defrost cycle has just started. In that case the flow is via 142 to instruction 143 "Set DFROST=T" which sets the DFROST flag. From instruction 143, instruction 144 "Save Start Defrost Cycle" directs the processor to save the start time for the defrost cycle, that is, store the current time shown on the time counter. Then flow proceeds via 145 to junction 151.

Referring back to inquiry 131, should the heat pump be in a heating mode, a "no" response would appear at 133 causing flow to inquiry 146 "DFROST=T?" which seeks to determine, by checking the status of the DFROST flag, whether or not the heat pump was in the defrost cycle on the last pass through the PSECND routine. If "no", flow proceeds to junction 151 via 147. If "yes", a response appears at 148 which causes flow to instruction 149 "Call DFOFF", a subroutine which directs the controller to save the current time at the end of a defrost cycle and to process the defrost time as will be explained with reference to FIG. 9. From instruction 149 flow passes to instruction 150 "Set DFROST=F" which clears the DFROST flag, and after that to junction 151.

The flow from 151 is to inquiry 152 "COMRUN=T?" which determines if the compressor was running on the last pass by sensing the COMRUN flag. Should the compressor have just begun to run, then a "no" response at 154 appears causing flow to instruction 155 "Save Start Time Compressor" which directs the processor to save the start run time for the compressor. From instruction 155 flow passes to instruction 156 "Set COMRUN=T", which directs the processor to set the COMRUN flag, after which flow proceeds to junction 157. Should the compressor have been running on the last pass then a "yes" response at 153 would have caused flow directly to junction 157.

From junction 157 flow is to inquiry 158 "DFROST=T?" which determines if the heat pump is in a defrost mode, and if "yes" then a response at 159 causes flow to junction 162. If "no" then a response appears at 160 which causes flow to instruction 161 "Call PAUX12" which directs the processor to execute the subroutine PAUX12. Subroutine PAUX12 checks the status of and computes the run time for the heat pump's auxiliary heating units as will be explained with reference to FIG. 10. The flow from junction 162 returns to the main loop 163 "RET".

Referring back to FIG. 4A and inquiry 127, which sought to determine whether or not the compressor was on, should the answer have been "no" then a response at 129 would cause flow to inquiry 164 "COMRUN=T?".

Inquiry 164 determines if the compressor was running the last time the PSECND routine was executed by checking the COMRUN flag and if a "no" response appears at 165 then flow returns via 166 "RET" to the main loop, IDLOOP. If "yes" a response at 167 indicates the compressor has just stopped running and the flow goes to instruction 168 "Store Current Time" which directs the processor to save the current time so that the compressor's actual run time may be calculated. From instruction 168 flow passes to instruction 169 "Set COMRUN=F" which tells the processor to clear the COMRUN flag. The flow from instruction 169 is to instruction 170 "Call COMPRT" which directs the processor to compute the run time for the compressor by executing subroutine COMPRT, as will be explained with reference to FIG. 7, and thence to instruction 171 "Call PROCRT" which causes the controller to process the compressor run time by executing secondary subroutine PROCRT to be explained with reference to FIG. 8. At this point, the indoor thermostat is not calling for heat as shown by the "no" response at 129. Therefore, the flow proceeds to instruction 172 "Set AUX1ON=F, AUX2ON=F, REVON=F" to force an end to the auxiliary cycles by clearing the AUX1ON, AUX2ON and REVON flags. The flow from instruction 172 is to inquiry 173 "DFROST=T?" which determines if the heat pump was in the defrost mode on the last pass, and, if "no", then it proceeds to junction 179 via 175. If "yes" then a response at 174 causes flow to instruction 176 "Call DFOFF" which directs the controller to process the defrost time by executing secondary subroutine DFOFF (FIG. 9), after which instruction 177 "Set DFROST=F" tells the processor to clear the DFROST flag. Flow then proceeds to junction 179 via 178 and thence to instruction 180 "Call PAUX12" which directs the controller to process the run time for the auxiliary heating units by calling secondary subroutine PAUX12 (FIG. 10). The system flow then returns to the main loop, IDLOOP, via 181 "RET".

Referring back to FIG. 2, from instruction 59 flow proceeds to inquiry 60 "FOURH=T?", which seeks to determine if the FOURH flag has been set, indicating that a time lapse of four hours has taken place. If the answer is "no" then flow passes via 61 back to junction 55 and if "yes" a response at 62 causes flow to instruction 63 "Call PCYCLE" which directs the processor to execute the routine labeled PCYCLE.

The PCYCLE routine routine performs most of the computation and limit checking of the program and is illustrated in FIG. 5. An entry point 184 "Routine PCYCLE" leads flow to instruction 185 "Compute Average Temperature" which directs the processor to compute the average outdoor temperature for the just completed four hour cycle. This is accomplished by dividing the five accumulated temperature readings by 5 and saving the result. The flow from instruction 185 is to inquiry 186 "Defrost Run Time Excessive?" which seeks to determine if the accumulated defrost cycle execution time is excessive by comparing it to the predetermined and stored expected defrost cycle execution time. If the actual defrost cycle time is within the expected time, then a "no" response appears at 187 which causes flow to junction 190. If it is excessive, a "yes" response appears at 188 causing flow to instruction 189 "Set Defrost Alarm" which sets the alarm bits for the fault indicator LED 40 and the alarm light 26 on user panel 34. Thence flow passes to junction 190.

From junction 190 flow proceeds to instruction 192 "Compute % Run Time" which directs the processor to compute the percent run times for the compressor and the primary auxiliary heating unit. Percent run times for the compressor are calculated by taking its actual accumulated minutes of run time and dividing by 240 minutes which is the duration of the test cycle. Percent run time for the auxiliary heat is calculated in the same way. Instruction 193 "Find Temperature in Table" then requires the processor to attempt to locate the computed average temperature value in a programmed temperature table stored in memory 24. Inquiry is then made to determine if a corresponding temperature was found in the processor's memory, 194 "Temperature Found?" and if "no" flow proceeds via 195 to junction 206. If "yes", a response appears at 196 causing flow to inquiry 197 "% Run Time Compressor>Table Value?" which directs the processor to make a comparison of the compressor's actual percent run time with its expected percent run time, the value of which was found in memory 24. If the compressor is not operating within its expected parameters a "yes" response at 198 will cause flow to instruction 200 "Set Compressor Alarm" which directs that the alarm bits for the fault indicator LED 36 and the alarm light 26 on user panel 34 to be set, and thence flow passes to junction 201. Should the compressor be operating within its expected parameters a "no" response at 199 would cause flow to junction 201 and thence to inquiry 202 "% Run Time Auxiliary Heat>Table Value?", which seeks to determine if the percent run time for the auxiliary heating unit is outside its expected parameter. If "yes" the alarm bit for the auxiliary heating unit fault indicator LED 38 and the alarm light 26 on user panel 34 is set at instruction 205 "Set Auxiliary Heat Alarm", after which flow passes to junction 206. Should the percent run time for the auxiliary heating unit have been within its expected parameter then a "no" response at 204 would have caused flow directly to junction 206.

The flow from junction 206 is to instruction 207 "Clear Flags and Accumulators" and thence to instruction 208 "Call STAVG" which directs the processor to get an initial temperature reading for the start of the new cycle. Flow then returns to the main program loop, IDLOOP, via 209 "RET".

After the flow returns from the execution of the PCYCLE subroutine it proceeds via 64 back to junction 55 for the start of a new four-hour monitoring cycle. FIGS. 6–10 illustrate the subroutines mentioned above. The execution in the program occurs when they are called during execution of either the PSECND routine or the PCYCLE routine.

Figure 6:
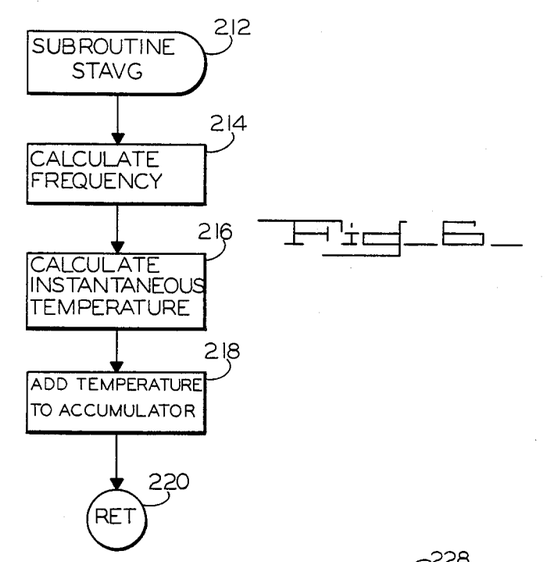
FIG. 6 is a flow chart of the subroutine STAVG.

The STAVG subroutine is illustrated in FIG. 6. After entering at point 212 "Subroutine STAVG", the flow proceeds to instruction 214 "Calculate Frequency". This the processor does by subtracting the previous count from the current count on the counter driven by voltage-to-frequency converter 20. From instruction 214 flow proceeds to instruction 216 "Calculate Instantaneous Temperature" which directs the processor to convert the frequency into an instantaneous temperature by referring to the frequency/temperature table in memory 24. The processor is then directed to add this instantaneous temperature to the accumulator for temperature averaging at the end of the four-hour cycle, 218 "Add Temperature to Accumulator". The flow from instruction 218 is to 220, "RET" which directs the processor to return to the point of call.

Figure 7:
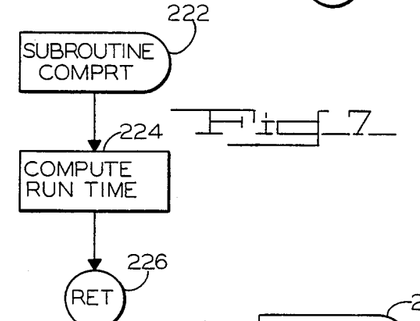
FIG. 7 is a flow chart of the subroutine COMPRT.
Figure 8:
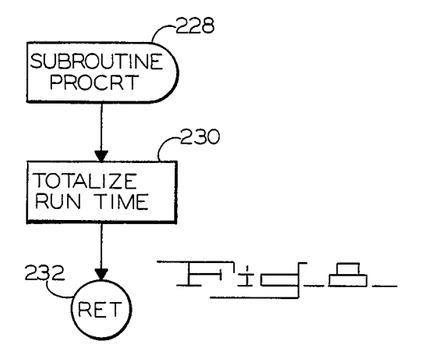
FIG. 8 is a flow chart of subroutine PROCRT.

FIGS. 7 and 8 are illustrations of subroutines COMPRT and PROCRT respectively. These subroutines are used to compute and process run times for the compressor, the auxiliary heat and the execution time for defrost cycles. The COMPRT subroutine is entered at point 222 "Subroutine COMPRT" and from there flow passes to instruction 224 "Compute Run Time" which directs the processor to compute the run time for the device or heat pump state referred to at the point of call. It is computed by subtracting the start time from the end time. From instruction 224 flow will return to point of call via 226. Subroutine PROCRT, shown in FIG. 8, is entered at 228 "Subroutine PROCRT", and flows to instruction 230 "Totalize Run Time". This is done by adding a newly computed run time to a previously stored run time for the device or heat pump state referred to at the point of call. Flow then returns to point of call via 232, "RET".

Figure 9:
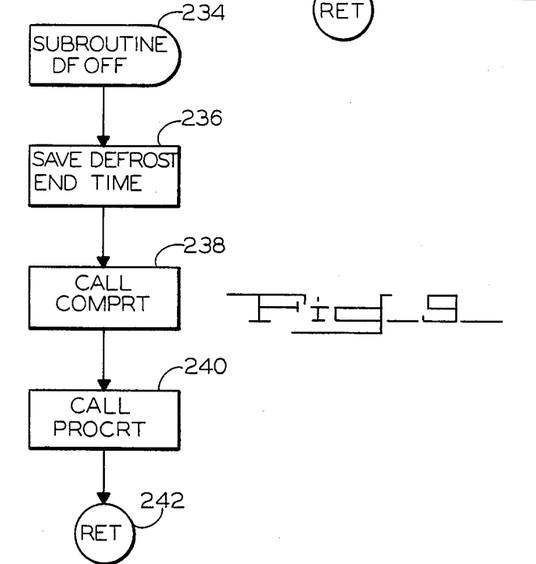
FIG. 9 is a flow chart of subroutine DFOFF.
Figure 10:
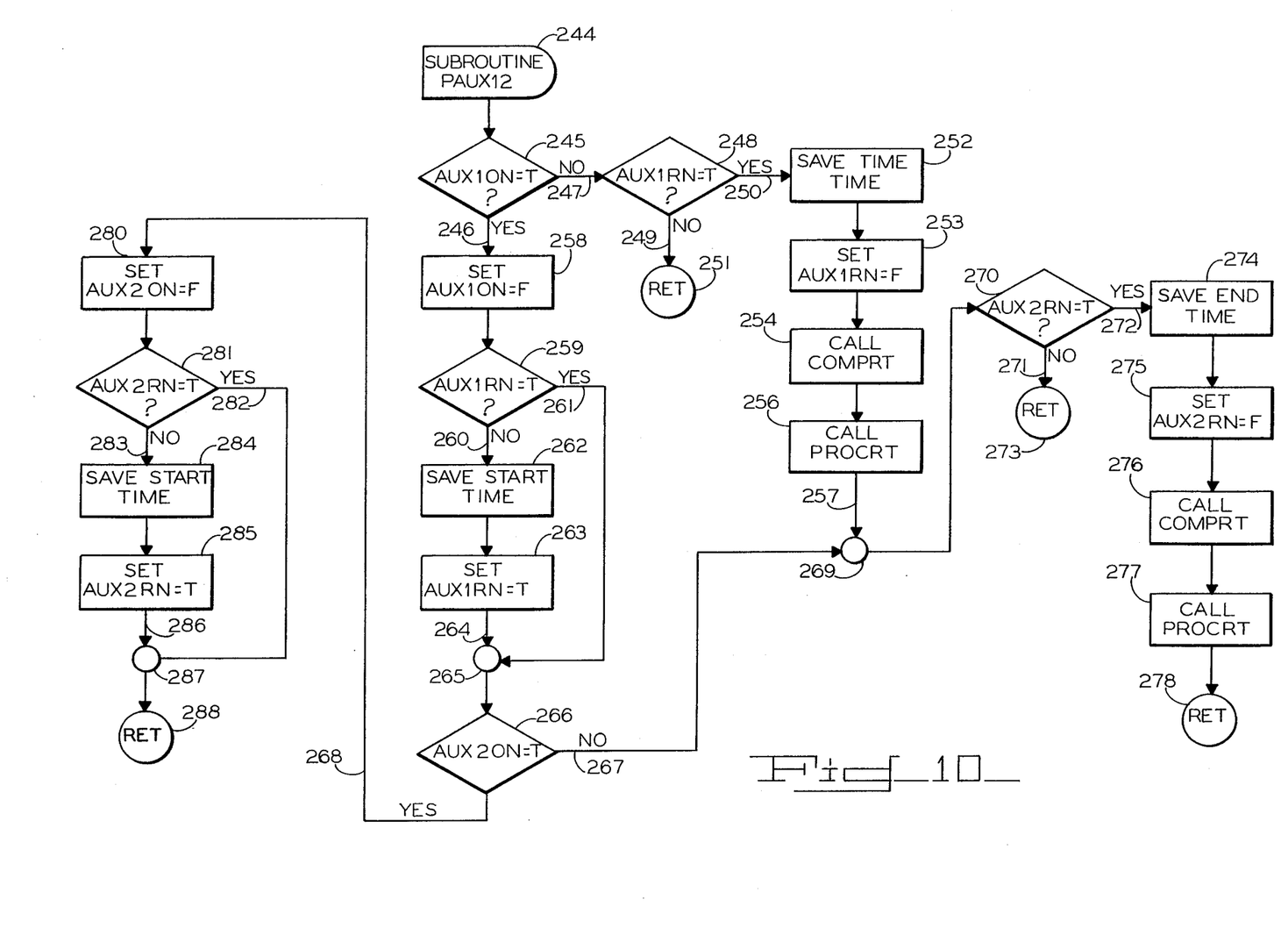
FIG. 10 is a flow chart showing subroutine PAUX12.

Subroutine DFOFF, illustrated in FIG. 9, is entered at point 234 "Subroutine DFOFF". From 234 flow passes to instruction 236 "Save Defrost End Time" which directs the processor to save the defrost cycle end time. The defrost cycle run time is then computed, 238 "Call COMPRT", and it is added to the previous total defrost run time, 240 "Call PROCRT". Flow then returns to point of call via 242.

FIG. 10 illustrates secondary subroutine PAUX12 which has an entry point at 244 "Subroutine PAUX12". Initially, inquiry 245 "AUX1ON=T?" seeks to determine if the primary auxiliary heating unit is on by sensing the state of the AUX1ON flag. If the primary auxiliary heating unit is not on, a "no" response appears at 247 causing flow to inquiry 248 "AUX1RN=T?" which determines whether the primary auxiliary heating unit was on during the last pass by sensing the state of the AUX1RN flag. The presence of a "no" response at 249 causes flow to return to point of call via 251 "RET". If a "yes" response appears at 250 flow proceeds to instruction 252 "Save End Time" which directs the processor to save the end run time for auxiliary heat unit 1, and then to instruction 253 "Set AUX1RN=F" which directs the processor to clear the AUX1RN flag which will indicate on the next pass that the primary auxiliary heat unit was not operating this time through the subroutine. The run time for the primary auxiliary heat unit is then computed in 254 "Call COMPRT" and is added to the previous total run time for the primary auxiliary heat for the present four-hour monitoring cycle 256 "Call PROCRT", after which flow proceeds via 257 to junction 269.

Referring back to inquiry 245, should the primary auxiliary heat unit be operating a "yes" response would appear at 246 which would cause flow to instruction 258 "Set AUX1ON=F" which directs the processor to clear the AUX1ON flag. From 258, the flow is to inquiry 259 which seeks to determine if the primary auxiliary heat unit was operating on the last pass through the subroutine and if "yes" then flow proceeds via 261 to junction 265. Should the answer to inquiry 259 be "no", which would indicate that the primary auxiliary heat unit has just initiated operation after being off, a response at 260 causes flow to instruction 262 "Save Start Time" which tells the processor to save the start time for the primary auxiliary heating unit and thence to instruction 263 "AUX1RN=T" which directs the processor to set the AUX1RN flag. Flow then proceeds via 264 to junction 265 and thence to inquiry 266, "AUX-2ON=T?" and if a "no" response appears at 267 flow proceeds to junction 269.

From junction 269 inquiry is made to determine whether the secondary auxiliary heat unit was running on the last pass through the subroutine, 270 "AUX2RN=T?". If the secondary auxiliary heating unit was not running on the last pass then a "no" response at 271 causes flow to return to point of call via 273 "RET". If the secondary auxiliary heat unit was operating on the previous pass then a "yes" response at 272 would cause flow to instruction 274 "Save End Time" which directs the processor to save the end run time for the secondary auxiliary heat unit and thence to instruction 275 "AUX2RN=F" which directs the processor to clear the AUX2RN flag. The subroutine then requires the processor to compute the run time for the secondary auxiliary heating unit, 276 "Call COMPRT", and to add that run time to the total run time for the four-hour monitoring cycle 277 "Call PROCRT", after which flow will return to point of call via 278.

Referring back to inquiry 266, if the secondary auxiliary heating unit was presently operating a "yes" response would appear at 268 causing flow to instruction 280 "Set AUX2ON=F" which directs the processor to clear flag AUX2ON. Flow then passes to inquiry 281 "AUX2RN=T?" which determines if the secondary auxiliary heating unit was operating on the previous pass. If "no", flow proceeds via 283 to instruction 284 "Save Start Time" which directs the processor to save the start run time for the secondary auxiliary heat unit and thence to instruction 285 "AUX2RN=T" which requires the processor to set the AUX2RN flag. Flow then proceeds by way of 286 to junction 287. Should the answer to inquiry 281 have been "yes" then a response at 282 would cause flow directly to junction 287. From junction 287 flow returns to the point of call via 288 "RET".

While this description is considered to be the preferred embodiment of the invention, it will be obvious to those skilled in the art that various changes and modification may be made therein without departing from the invention.

What is claimed is:

1. A method for monitoring a heat pump system used to maintain a preselected indoor temperature in an enclosed space having a known heat transfer rate, said system including a heat pump compressor, comprising the steps of:
    sensing the actual run time for the heat pump compressor being monitored during a predetermined test time interval;
    sensing an average outdoor temperature ambient to the enclosed space for the test time interval;
    storing the expected run time for the compressor being monitored to maintain the preselected indoor temperature for the average outdoor temperature sensed and for the known heat transfer rate of the enclosure;
    comparing the actual run time with the expected run time; and
    automatically providing an indication when the actual run time exceeds the expected run time.

2. The method of claim 1 wherein the compressor run time sensing step includes the steps of repeatedly detecting the status of the compressor as activated or deactivated and providing a signal indicative of its current status.

3. The method of claim 2 wherein the system being monitored has a reversing valve selectively operable between a heating and an air-conditioning or defrost status and the method further includes the steps of sensing the status of said valve and providing a signal indicative of its current status.

4. The method of claim 1 wherein the system being monitored includes at least one auxiliary heat means and the method further comprises the steps of sensing the actual run time of the auxiliary heat means, storing the expected run time of the auxiliary heat, comparing the actual run time of the auxiliary heat means with its expected run time and providing an alarm when the former exceeds the latter.

5. The method of claim 3 wherein the system being monitored executes a defrost cycle at various times during its operation and the method further comprises the steps of:
 sensing the actual defrost cycle execution time;
 storing the expected defrost cycle execution time;
 comparing the actual and expected defrost cycle execution times; and
 providing an alarm when the former exceeds the latter.

6. Apparatus for monitoring a heat pump system used to maintain a preselected indoor temperature in an enclosed space having a known heat transfer rate, said system including a heat pump compressor, comprising:
 means for sensing the actual run time for the heat pump compressor being monitored during a predetermined test time interval;
 means for sensing an average outdoor temperature ambient to the enclosed space for the test time interval;
 means for storing the expected run time for the compressor being monitored to maintain the preselected indoor temperature for the average outdoor temperature sensed and for the known heat transfer rate of the enclosure;
 means for comparing the actual run time with the expected run time; and
 means for automatically providing an indication when the actual run time exceeds the expected run time.

7. The apparatus of claim 6 wherein the compressor run time sensing means includes means electrically coupled to the heat pump system for detecting the status of the compressor as activated or deactivated and providing a signal indicative of its current status.

8. The apparatus of claim 7 wherein the system being monitored has a reversing valve selectively operable between a heating and an air-conditioning or defrost status and the apparatus further includes means for sensing the status of said valve and providing a signal indicative of its current status.

9. The apparatus of claim 6 wherein the system being monitored includes at least one auxiliary heat means and the apparatus further comprises means for sensing the actual run time of the auxiliary heat means, means for storing the expected run time of the auxiliary heat, means for comparing the actual run time of the auxiliary heat means with its expected run time and means for providing an alarm when the former exceeds the latter.

10. The apparatus of claim 8 wherein the system being monitored executes a defrost cycle at various times during its operation and the apparatus further comprises:
 means for sensing the actual defrost cycle execution time;
 means for storing an expected defrost cycle execution time;
 means for comparing the actual and expected defrost cycle execution times; and
 means for providing an alarm when the former exceeds the latter.

* * * * *